United States Patent
Trotter

[11] Patent Number: 6,055,763
[45] Date of Patent: May 2, 2000

[54] GLOWING FISH HOOK

[76] Inventor: Martin S. Trotter, 1127 N. Barronca P.O. Box 3406, Covina, Calif. 91722

[21] Appl. No.: 08/985,166

[22] Filed: Dec. 4, 1997

[51] Int. Cl.[7] .................................................. A01K 85/01
[52] U.S. Cl. .............................................................. 43/17.6
[58] Field of Search ..................................... 43/17.5, 17.6

[56] References Cited

U.S. PATENT DOCUMENTS

| | | | |
|---|---|---|---|
| 3,828,177 | 8/1974 | Day | 240/6.4 |
| 3,935,659 | 2/1976 | McCallum | 43/17.6 |
| 3,936,970 | 2/1976 | Hodges | 43/17.6 |
| 4,236,342 | 12/1980 | Saia | 43/17.6 |
| 4,347,681 | 9/1982 | Fima | 43/17.6 |
| 4,638,584 | 1/1987 | Lindsay | 43/17.6 |
| 4,700,504 | 10/1987 | Mattison | 43/42.33 |
| 5,063,700 | 11/1991 | Kiefer et al. | 43/17.6 |
| 5,737,867 | 4/1998 | Tsutsumi et al. | 43/17.6 |

*Primary Examiner*—Jack W. Lavinder

[57] ABSTRACT

A new glowing fish hook for attracting a fish's attention to bait on the hook. The inventive device includes an illuminated hollow cylindrical shrink tubing having an upper end, a lower end and a cylindrical side wall therebetween. The shrink tubing has an interior filled with shredded pieces of shrink tubing. The upper end has an eyelet extending outwardly therefrom. The lower end has a shank extending outwardly therefrom. The shank has a chenille extending downwardly therefrom. The shank has a hook portion extending outwardly therefrom. A plurality of fiber optic feathers extend outwardly from the lower end of the shrink tubing.

5 Claims, 1 Drawing Sheet

GLOWING FISH HOOK

BACKGROUND OF THE INVENTION

1. Field of the Invention

The present invention relates to illuminated fishing lures and more particularly pertains to a new glowing fish hook for attracting a fish's attention to bait on the hook.

2. Description of the Prior Art

The use of illuminated fishing lures is known in the prior art. More specifically, illuminated fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art illuminated fishing lures include U.S. Pat. No. 3,935,659 to McCallum; U.S. Pat. No. 3,936,970 to Hodges; U.S. Pat. No. 4,638,584 to Lindsay; U.S. Pat. No. 5,175,951 to Fruchey; U.S. Pat. No. 4,693,030 to Wohead; and U.S. Pat. No. Des. 349,747 to Patrin.

While these devices fulfill their respective, particular objectives and requirements, the aforementioned patents do not disclose a new glowing fish hook. The inventive device includes an illuminated hollow cylindrical shrink tubing having an upper end, a lower end and a cylindrical side wall therebetween. The shrink tubing has an interior filled with shredded pieces of shrink tubing. The upper end has an eyelet extending outwardly therefrom. The lower end has a shank extending outwardly therefrom. The shank has a chenille extending downwardly therefrom. The shank has a hook portion extending outwardly therefrom. A plurality of fiber optic feathers extend outwardly from the lower end of the shrink tubing.

In these respects, the glowing fish hook according to the present invention substantially departs from the conventional concepts and designs of the prior art, and in so doing provides an apparatus primarily developed for the purpose of attracting a fish's attention to bait on the hook.

SUMMARY OF THE INVENTION

In view of the foregoing disadvantages inherent in the known types of illuminated fishing lures now present in the prior art, the present invention provides a new glowing fish hook construction wherein the same can be utilized for attracting a fish's attention to bait on the hook.

The general purpose of the present invention, which will be described subsequently in greater detail, is to provide a new glowing fish hook apparatus and method which has many of the advantages of the illuminated fishing lures mentioned heretofore and many novel features that result in a new glowing fish hook which is not anticipated, rendered obvious, suggested, or even implied by any of the prior art illuminated fishing lures, either alone or in any combination thereof.

To attain this, the present invention generally comprises an illuminated hollow cylindrical shrink tubing having an upper end, a lower end and a cylindrical side wall therebetween. The shrink tubing has an interior filled with shredded pieces of shrink tubing. The upper end has an eyelet extending outwardly therefrom. The lower end has a shank extending outwardly therefrom. The shank has a chenille extending downwardly therefrom. The shank has a hook portion extending outwardly therefrom. A plurality of fiber optic feathers extend outwardly from the lower end of the shrink tubing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new glowing fish hook apparatus and method which has many of the advantages of the illuminated fishing lures mentioned heretofore and many novel features that result in a new glowing fish hook which is not anticipated, rendered obvious, suggested, or even implied by any of the prior art illuminated fishing lures, either alone or in any combination thereof.

It is another object of the present invention to provide a new glowing fish hook which may be easily and efficiently manufactured and marketed.

It is a further object of the present invention to provide a new glowing fish hook which is of a durable and reliable construction.

An even further object of the present invention is to provide a new glowing fish hook which is susceptible of a low cost of manufacture with regard to both materials and labor, and which accordingly is then susceptible of low prices of sale to the consuming public, thereby making such glowing fish hook economically available to the buying public.

Still yet another object of the present invention is to provide a new glowing fish hook which provides in the apparatuses and methods of the prior art some of the advantages thereof, while simultaneously overcoming some of the disadvantages normally associated therewith.

Still another object of the present invention is to provide a new glowing fish hook for attracting a fish's attention to bait on the hook.

Yet another object of the present invention is to provide a new glowing fish hook which includes an illuminated hollow cylindrical shrink tubing having an upper end, a lower end and a cylindrical side wall therebetween. The shrink tubing has an interior filled with shredded pieces of shrink tubing. The upper end has an eyelet extending outwardly therefrom. The lower end has a shank extending outwardly therefrom. The shank has a chenille extending downwardly therefrom. The shank has a hook portion extending outwardly therefrom. A plurality of fiber optic feathers extend outwardly from the lower end of the shrink tubing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
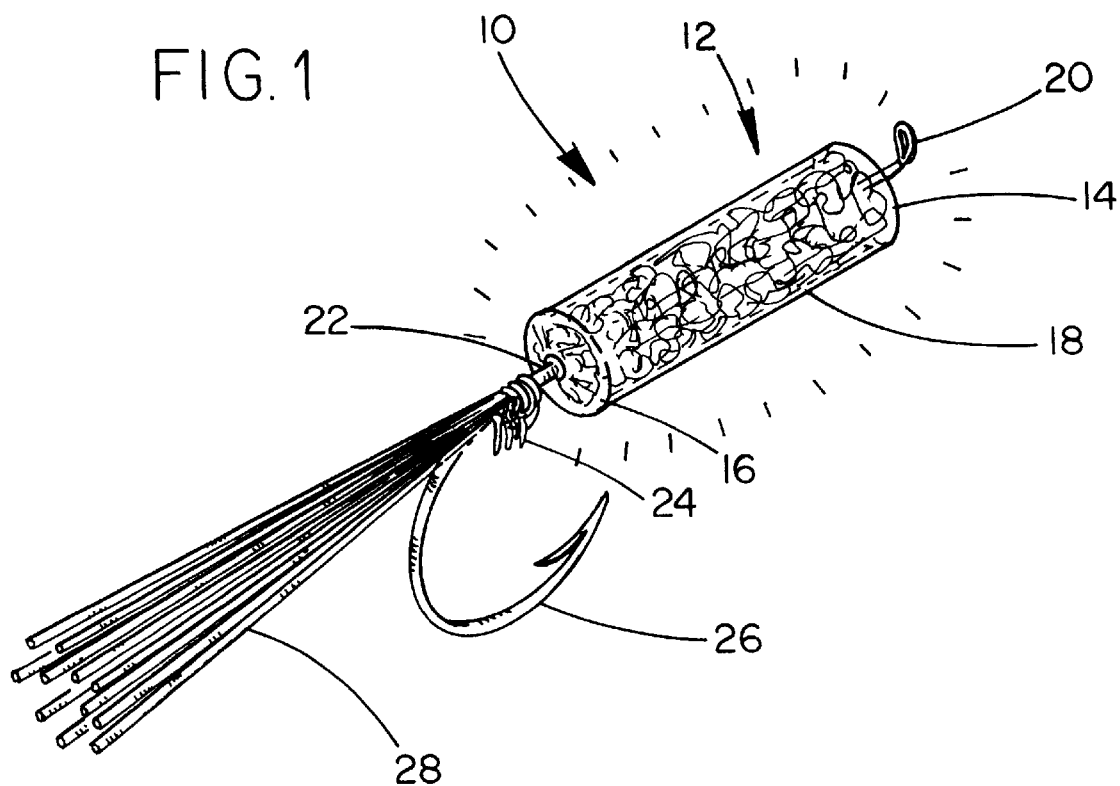
FIG. 1 is a perspective view of a new glowing fish hook according to the present invention.
Figure 2:
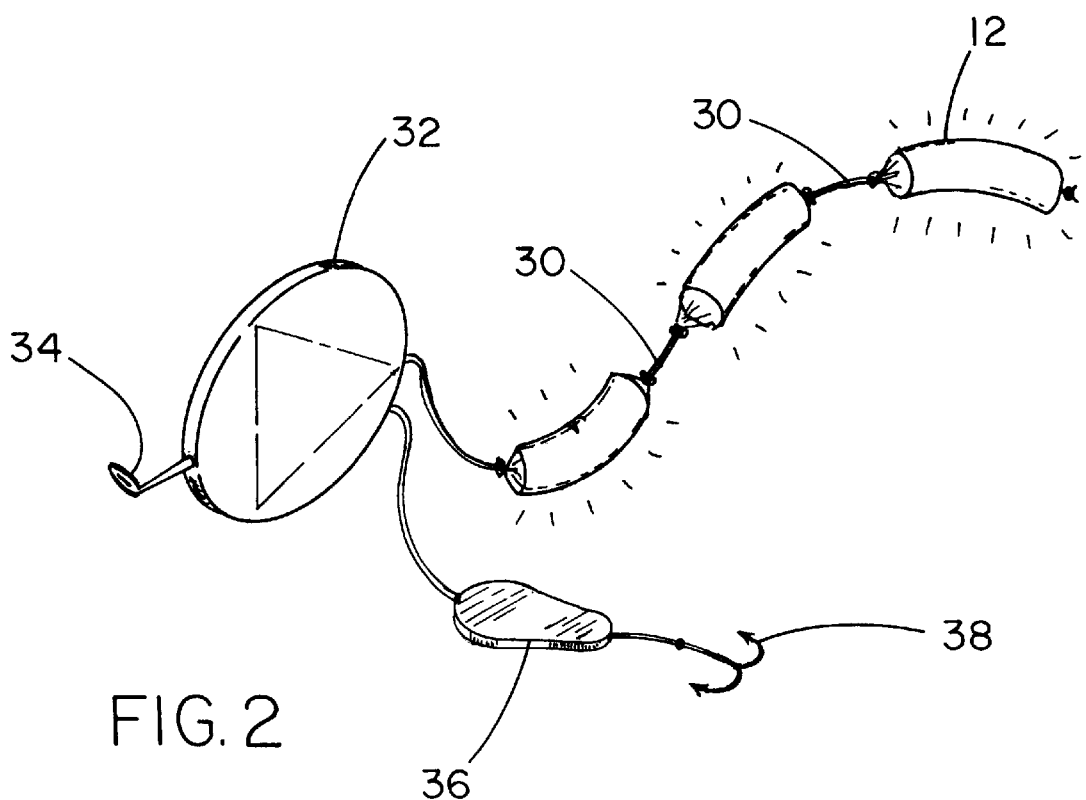
FIG. 2 is a perspective view of a second embodiment of the present invention.

With reference now to the drawings, and in particular to FIGS. 1 and 2 thereof, a new glowing fish hook embodying the principles and concepts of the present invention and generally designated by the reference numeral 10 will be described.

As best illustrated in FIGS. 1 and 2, the glowing fish hook 10 comprises an illuminated hollow cylindrical shrink tubing 12 having an upper end 14, a lower end 16 and a cylindrical side wall 18 therebetween. The shrink tubing 12 has an interior filled with shredded pieces of shrink tubing. The upper end 14 has an eyelet 20 extending outwardly therefrom. The lower end 16 has a shank 22 extending outwardly therefrom. The shank 22 has a chenille 24 extending downwardly therefrom. The shank 22 has a hook portion 26 extending outwardly therefrom.

A plurality of fiber optic feathers 28 extend outwardly from the lower end 16 of the shrink tubing 12. The feathers 28 serve to further illuminate the device 10 for attraction to by fish.

FIG. 2 illustrates an alternate embodiment of the present invention. In this embodiment, three illuminated shrink tubings 12 are provided with each being held together by a length of rope 30. A lure 32 is secured to one of the shrink tubings 12. An eyelet 34 is secured to the lure 32. A weight 36 is secured to the lure 32. The weight 36 has a hook 38 secured thereto.

In use, the present invention would be effective in attracting a fish's attention to bait disposed on the hook portion 26 for greater fishing success. The device 10 would be produced in various sizes and different colors and styles for different fishing conditions and individual preferences. For use, a fisherman would attach this device 10 in the conventional manner, then hold the device 10 under a light source. The light source would cause the tubing 12 to glow and make the device 10 illuminated when cast and played in the water.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A glowing fish hook for attracting a fish's attention to bait on the hook comprising, in combination:

an illuminated hollow cylindrical phosphorescent shrink tubing, said shrink tubing having an upper end, a lower end and a cylindrical side wall extending therebetween, the shrink tubing having an interior filled with shredded pieces of shrink tubing for providing a plurality of shrink tubing edges for reflecting light, the upper end having an eyelet extending outwardly therefrom, the lower end having a shank extending outwardly therefrom, the shank having a chenille extending downwardly therefrom, the shank having a hook portion extending outwardly therefrom; and a plurality of fiber optic feathers extending outwardly from the lower end of the shrink tubing.

2. A glowing fish hook for attracting a fish's attention to bait on the hook comprising, in combination:

at least one illuminated hollow cylindrical phosphorescent shrink tubing, said shrink tubing having an upper end, a lower end and a cylindrical side wall therebetween, the shrink tubing having an interior filled with shredded pieces of phosphorescent shrink tubing; and a lure having a hook coupled to said lure, said lure being coupled to one of said shrink tubings.

3. The glowing fish hook as set forth in claim 2 wherein three illuminated shrink tubings are provided, each shrink tubing being coupled to an adjacent shrink tubing by a length of rope.

4. The glowing fish hook as set forth in claim 3 and further including an eyelet secured to the lure.

5. The glowing fish hook as set forth in claim 4 and further including a weight secured to the lure between said lure and said hook.

* * * * *